(12) United States Patent
Han

(10) Patent No.: US 6,310,916 B1
(45) Date of Patent: Oct. 30, 2001

(54) METHOD AND APPARATUS FOR ENCODING A VIDEO SIGNAL

(75) Inventor: Seok-Won Han, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/088,685

(22) Filed: Jun. 2, 1998

(30) Foreign Application Priority Data

Mar. 14, 1998 (KR) .................................................. 98-8639

(51) Int. Cl.[7] ...................................................... H04N 7/12
(52) U.S. Cl. ...................................................... 375/240.11
(58) Field of Search .................................. 348/420, 403; 382/250, 243; 386/95; 375/240

(56) References Cited

U.S. PATENT DOCUMENTS

| 5,623,310 | | 4/1997 | Kim . | |
|---|---|---|---|---|
| 5,666,461 | * | 9/1997 | Igarashi et al. | 386/95 |
| 5,748,789 | * | 5/1998 | Lee et al. | 382/243 |
| 5,946,043 | * | 8/1999 | Lee et al. | 348/420 |
| 5,991,453 | * | 11/1999 | Kweon et al. | 382/250 |

FOREIGN PATENT DOCUMENTS 0720377  7/1996  (EP) .
9716030  5/1997  (WO) .

* cited by examiner

*Primary Examiner*—Chris Kelley
*Assistant Examiner*—Allen Wong
(74) *Attorney, Agent, or Firm*—Pennie & Edmonds LLP

(57) ABSTRACT

A video signal encoder codes a video signal including texture information and shape information on each of macroblocks, a macroblock having 16×16 pixels and being dividable into 4 number of equal-sized DCT-blocks. The encoder produces encoded shape information by encoding the shape information on a processing macroblock and generates a reconstructed shape information by decoding the encoded shape information. Then, a DCT_type of the processing macroblock is determined based on the reconstructed shape information and the texture information on the processing macroblock to thereby provide DCT_type information representing the DCT_type. Once the DCT_type of the processing macroblock is decided, the encoder generates encoded texture information by adaptively encoding the texture information through the use of a progressive or an interlaced coding technique in response to the DCT_type information. Furthermore, the encoder generates CBPY information by using the encoding results of the texture information and provides a data stream to be transmitted in sequence of the encoded shape information, the encoded CBPY information, the DCT_type information and the encoded texture information.

14 Claims, 6 Drawing Sheets

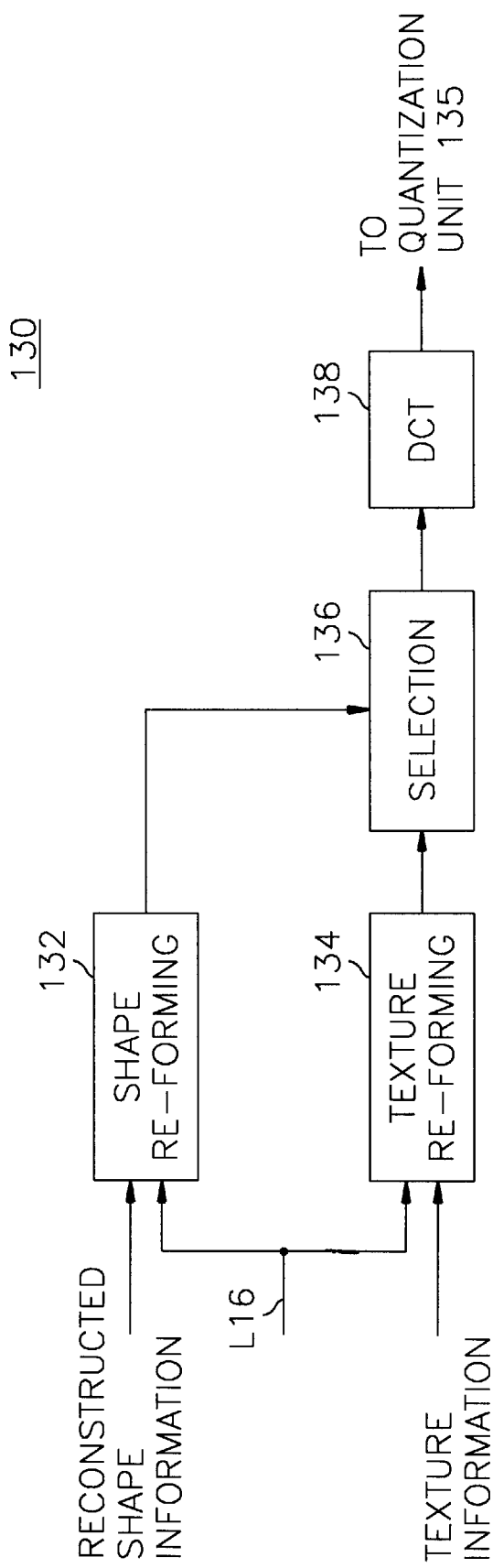

FIG. 5

| ENCODED SHAPE INFORMATION | ... | ENCODED CBPY INFORMATION | ... | DCT_TYPE INFORMATION | ... | ENCODED TEXTURE INFORMATION |

METHOD AND APPARATUS FOR ENCODING A VIDEO SIGNAL

FIELD OF THE INVENTION

The present invention relates to a method and an apparatus for coding a video signal; and, more particularly, to a method and an apparatus for effectively encoding texture information of the video signal by determining a coding type of the texture information based on the texture information and its corresponding shape information.

DESCRIPTION OF THE PRIOR ART

In digital video systems such as video-telephone and teleconference systems, a large amount of digital data is needed to define each video signal since the video signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects and three sets of parameters for defining the motion, contour and pixel data of each object are processed through different encoding channels.

One example of such object-oriented coding schemes is the so-called MPEG (Moving Picture Experts Group) phase 4 (MPEG-4), which is designed to provide an audio-visual coding standard for allowing a content-based interactivity, improved coding efficiency and/or universal accessibility in such applications as low bit-rate communication, interactive multimedia(e.g., games, interactive TV, etc.) and area surveillance (see, for instance, *MPEG-4 Video Verification Model Version* 7.0, International Organization for Standardization, Coding of Moving Pictures and Associated Audio Information, ISO/IEC JTC1/SC29/WG11 MPEG97/N1642, Bristol, April 1997).

According to MPEG-4, an input video image is divided into a plurality of video object planes (VOP's), which correspond to entities in a bitstream that a user can access and manipulate. A VOP can be represented by a bounding rectangle whose width and height may be the smallest multiples of 16 pixels (a macroblock size) surrounding each object so that the encoder processes the input video image on a VOP-by-VOP basis.

A VOP disclosed in MPEG-4 includes shape information and texture information for an object therein which are represented by a plurality of macroblocks on the VOP, each of the macroblocks having, e.g., 16×16 pixels. Each of the macroblocks on the VOP can be classified into one of a background, a boundary and an object macroblocks. The background macroblock contains only background pixels located outside an object in the VOP; the boundary macroblock includes at least one background pixel and at least one object pixel located inside the object; and the object macroblock has only object pixels. The shape information is encoded by using, e.g., a context-based arithmetic encoding (CAE) technique on a macroblock basis and the texture information is encoded through the use of conventional encoding techniques such as DCT (discrete cosine transform), quantization and VLC (variable length coding) techniques on the macroblock basis. Specifically, the DCT process for transforming the texture information is performed on a DCT-block basis, wherein a macroblock is divided into 4 DCT-blocks of 8×8 pixels.

From the DCT and the quantization processes, one DC component and a multiplicity of AC components are produced for each DCT-block. However, if all values of texture information for a DCT-block are constant, there is no corresponding nonzero AC component for the DCT-block. Therefore, CBPY (coded block pattern type) information has been proposed to represent whether a DCT-block has at least one corresponding non-zero AC component. To be more specific, if there exists at least one non-zero AC component corresponding to a DCT-block, the CBPY information obtains a bit of, e.g., "1", and, if otherwise, a bit of, e.g., "0". Accordingly, a decoding part can tell the existence of non-zero AC components for a corresponding DCT-block by simply detecting the CBPY information transmitted thereto through a transmission channel without any further information for the corresponding DCT-block and before encoded texture information for the corresponding DCT-block is transmitted thereto.

Conventionally, in order to encode the texture information for the VOP, the texture information on each of the macroblocks is processed by adaptively using a progressive and an interlaced coding techniques to thereby enhance the coding efficiency. Therefore, DCT_type information representing a coding condition, i.e., a DCT_type, of the texture information is employed and the DCT_type is determined on the macroblock basis using the texture information. For example, a video signal encoder determines an appropriate DCT_type for a macroblock by comparing a spatial correlation between pixel rows in the macroblock which are re-formed to a progressive or an interlaced type macroblock according to the progressive or the interlaced coding technique. If the progressive coding technique is determined to be more effective, the DCT_type information on the macroblock will have a bit of, e.g., "0", and, if otherwise, a bit of, e.g., "1".

After the DCT_type for a macroblock is determined based on the texture information, the CBPY information on the macroblock is obtained from quantized DCT results which are derived by performing the DCT and the quantization processes for the texture information on the macroblock in the determined DCT_type thereof.

For instance, if a macroblock is a background macroblock, its texture information is not encoded and, therefore, its DCT_type and CBPY information are not generated.

If the macroblock is an object macroblock, either the progressive or the interlaced coding technique can be selected based on the texture information on the macroblock and, therefore, the DCT_type information of the object macroblock representing the selected coding technique is produced. Also, the CBPY information of the object macroblock will have 4-bit data, the respective bits corresponding to the respective 4 DCT-blocks within the macroblock, since the object macroblock has 4 non-transparent DCT-blocks, wherein a non-transparent DCT-block has a DCT-block size and contains at least one object pixel to be encoded.

On the other hand, if the macroblock is a boundary macroblock, either the progressive or the interlaced coding technique is also chosen based on the texture information on the macroblock. In addition, the boundary macroblock can include both a transparent DCT-block and a non-transparent DCT-block together, wherein the transparent DCT-block has only background pixels therein and need not be encoded. Consequently, the CBPY information corresponding to the boundary macroblock may have i-bit data, i being a positive integer ranging from 1 to 4, and the respective bits corresponding to the respective non-transparent DCT-blocks in the macroblock.

Referring to FIGS. 4A to 4C, there are provided various examples of boundary macroblocks which are classified into two different types, i.e., a progressive and an interlaced type macroblocks. In the drawings, macroblocks P1 to P3, which represent progressive type macroblocks, respectively, are reformed to interlaced type macroblocks I1 to I3 including top- and bottom-field DCT-blocks IT1 and IB1 to IT3 and IB3, respectively. Therefore, in the progressive coding technique, the macroblock is encoded based on the progressive type macroblock while it is encoded by using the interlaced type macroblock including the top- and bottom-field DCT-blocks in the interlaced coding technique.

As can be seen in FIG. 4A, since both the progressive type macroblock P1 and its interlaced type macroblock I1 contain only non-transparent DCT-blocks, the corresponding CBPY information has 4-bit data regardless of the DCT_type of the macroblock.

However, in FIGS. 4B and 4C, the numbers of non-transparent DCT-blocks within a progressive and an interlaced type macroblocks are different from each other depending on their DCT_types. Consequently, the bit-number of the CBPY information is also changed according to the DCT_type. To be more specific, when the macroblock P2 is encoded through the progressive coding technique, 2-bit CBPY information is generated and, if otherwise, 4-bit CBPY information is produced. Meanwhile, when the macroblock P3 is encoded through the progressive coding technique, 2-bit CBPY information is generated and, if otherwise, 1-bit CBPY information is produced.

As can be noted above, if a macroblock to be processed is a boundary macroblock, the bit-number of the CBPY information, i.e., the number of non-transparent DCT-blocks therein, is determined depending on its DCT_type.

However, in the above conventional encoding method employing the CBPY and the DCT_type information, a data stream to be transmitted to the decoding part has a sequence as shown in FIG. 5. Namely, encoded shape information is transmitted first to the decoding part and the other encoded information follows the encoded shape information in the order of CBPY, DCT_type and texture information.

Therefore, when the decoding part receives the encoded information in the above sequence and a processed macroblock is a boundary macroblock, the decoding part may not correctly predict the bit-number of the CBPY information, i.e., the number of non-transparent DCT-blocks within the processed macroblock and, consequently, may not accurately reconstruct the CBPY information since the CBPY information has been determined depending on the DCT_type information which is transmitted to the decoding part after the encoded CBPY information.

SUMMARY OF THE INVENTION

It is, therefore, a primary object of the invention to provide a method and an apparatus, for use in a video signal encoder, for encoding texture information of a video signal by using its corresponding shape information in addition to the texture information.

In accordance with one aspect of the present invention, there is provided a method, for use in a video signal encoder, for coding texture information of a video signal which includes the texture information and shape information on each of macroblocks, each macroblock having M×M pixels and being dividable into P number of equal-sized DCT-blocks, M and P being positive integers, respectively, comprising the steps of: (a) determining a DCT_type of a processing macroblock based on the shape information and the texture information on the processing macroblock, wherein the DCT_type represents the more effective coding technique between a progressive and an interlaced coding techniques for encoding the texture information; and (b) generating encoded texture information by adaptively encoding the texture information through the use of the progressive or the interlaced coding technique in response to the DCT_type.

In accordance with another aspect of the present invention, there is provided an apparatus for coding a video signal which includes texture information and shape information for each of macroblocks, each macroblock having M×M pixels and being dividable into P number of equal-sized DCT-blocks, M and P being positive integers, respectively, comprising: a shape encoder for producing encoded shape information by encoding shape information for a processing macroblock and generating reconstructed shape information by decoding the encoded shape information; a DCT_type determination unit for deciding a DCT_type of the processing macroblock based on the reconstructed shape information and the texture information for the processing macroblock and providing the DCT_type information representing the DCT_type, wherein the DCT_type represents the more effective coding technique between a progressive and an interlaced coding techniques for encoding the texture information; and a texture encoder for generating encoded texture information by adaptively encoding the texture information through the use of the progressive or the interlaced coding technique in response to the DCT_type information.

BRIEF DESCRIPTION OF THE DRAWINGS

The above and other objects and features of the present invention will become apparent from the following description of preferred embodiments given in conjunction with the accompanying drawings, in which:

FIG. 3 presents a detailed block diagram of the modified DCT unit 130 in FIG. 1;

FIG. 5 shows a sequence of a data stream to be transmitted to a decoding part.

DETAILED DESCRIPTION OF THE PREFERRED EMBODIMENTS

A video signal includes shape information and texture information on a plurality of macroblocks therein and, in accordance with embodiments of the present invention, the texture information is adaptively encoded on a macroblock basis through the use of either a progressive or an interlaced coding technique. Each of the macroblocks has M×M, e.g., 16×16, pixels and can be divided into 4 DCT-blocks having a same number of pixels, e.g., 8×8 pixels, M being a positive integer. In accordance with the present invention, an appropriate coding technique, i.e., either the progressive or the interlaced coding technique, for each of the macroblocks is determined based on the texture and the shape information thereon while it has been determined by using only the texture information in the conventional coding method.

Figure 1:
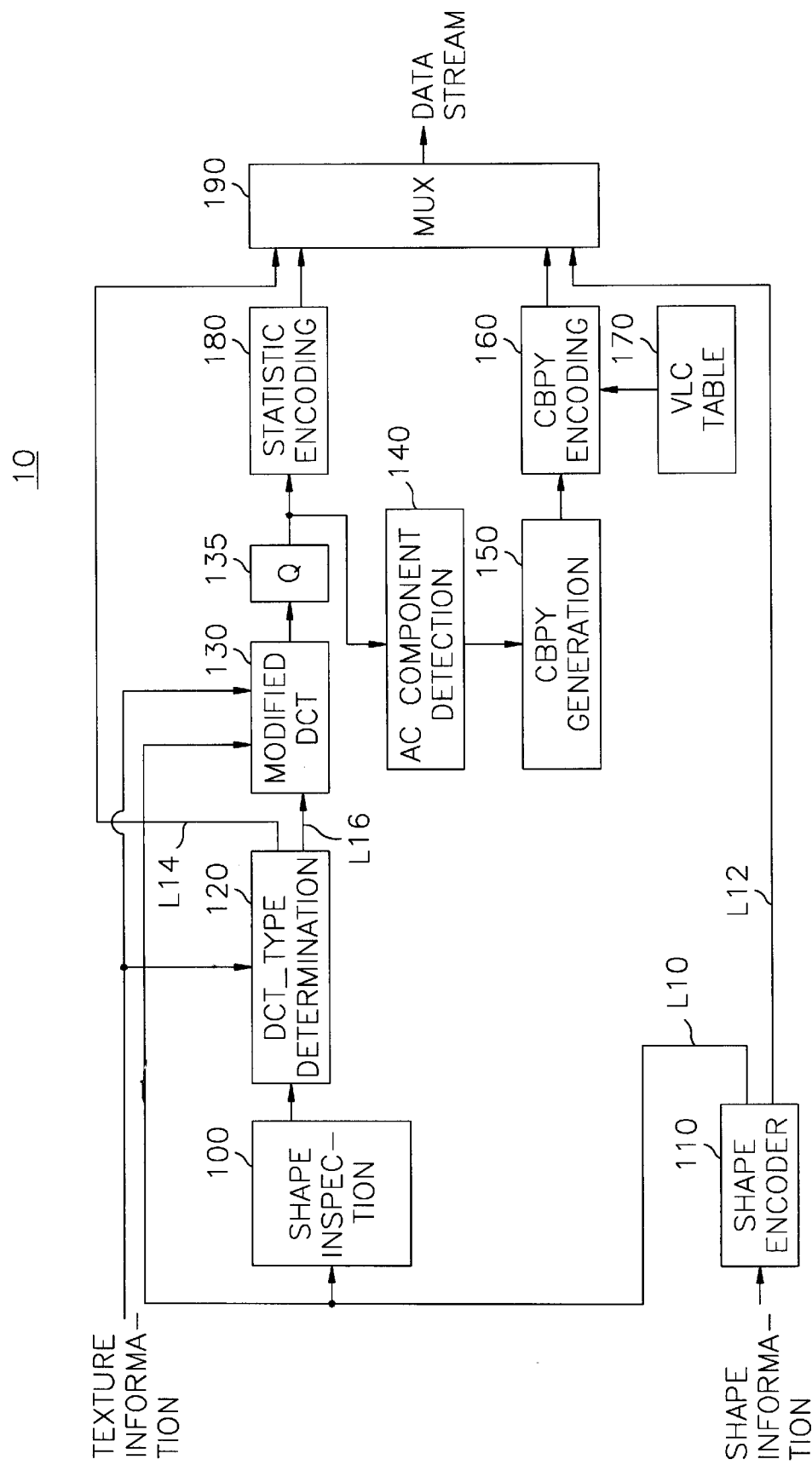
FIG. 1 represents a block diagram of a video signal encoder in accordance with a first embodiment of the present invention.

Referring to FIG. 1, there is provided a block diagram of a video signal encoder 10 in accordance with a first embodiment of the present invention.

Texture information on a processing macroblock is inputted to a DCT_type determination unit 120 and a modified DCT unit 130 in parallel and its corresponding shape information is coupled to a shape encoder 110.

The shape encoder 110 encodes the shape information by using a known shape coding method, e.g., the CAE technique disclosed in MPEG-4 supra, to thereby generate encoded shape information and provide the encoded shape information to a multiplexor (MUX) 190 via a line L12. The shape encoder 110 also provides reconstructed shape information on the processing macroblock, which is generated by decoding the encoded shape information, to a shape inspection unit 100 and the modified DCT unit 130 via a line L10 in parallel.

The shape inspection unit 100 determines a block type of the processing macroblock based on the reconstructed shape information, wherein the block type includes a background, an object and a boundary macroblocks. The background macroblock is comprised of only background pixels; the object macroblock includes only object pixels therein; and the boundary macroblock contains at least one object pixel and at least one background pixel together therein. If the block type of the processing macroblock is determined, the shape inspection unit 100 provides a block indication signal, representing the block type of the processing macroblock, to the DCT_type determination unit 120.

The DCT_type determination unit 120 decides a DCT_type of the processing macroblock in response to the texture information on the processing macroblock and the block indication signal derived from the shape inspection unit 100.

Figure 4A:
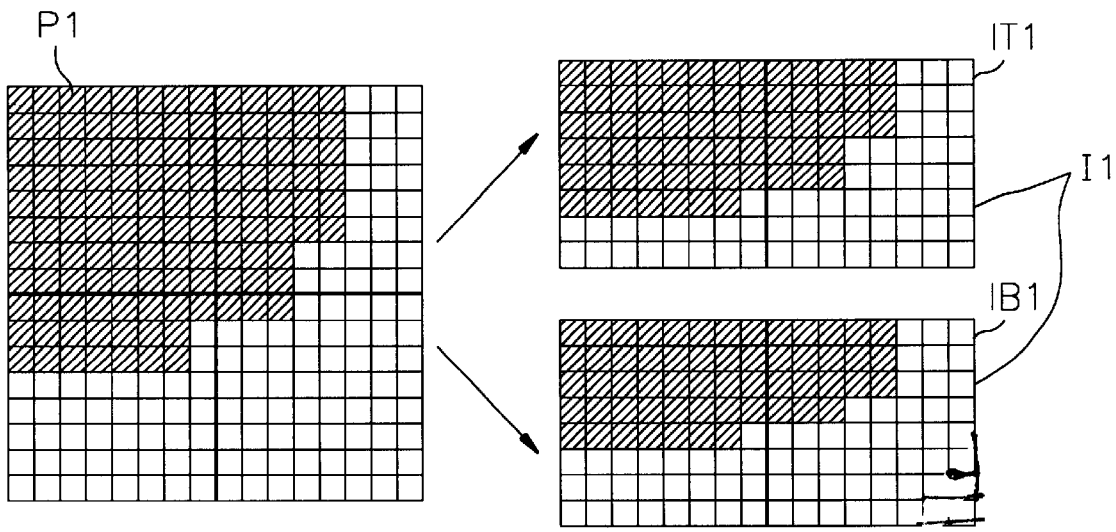
FIGS. 4A and 4C describe examples of boundary macroblocks which are classified into two different types.
Figure 4B:
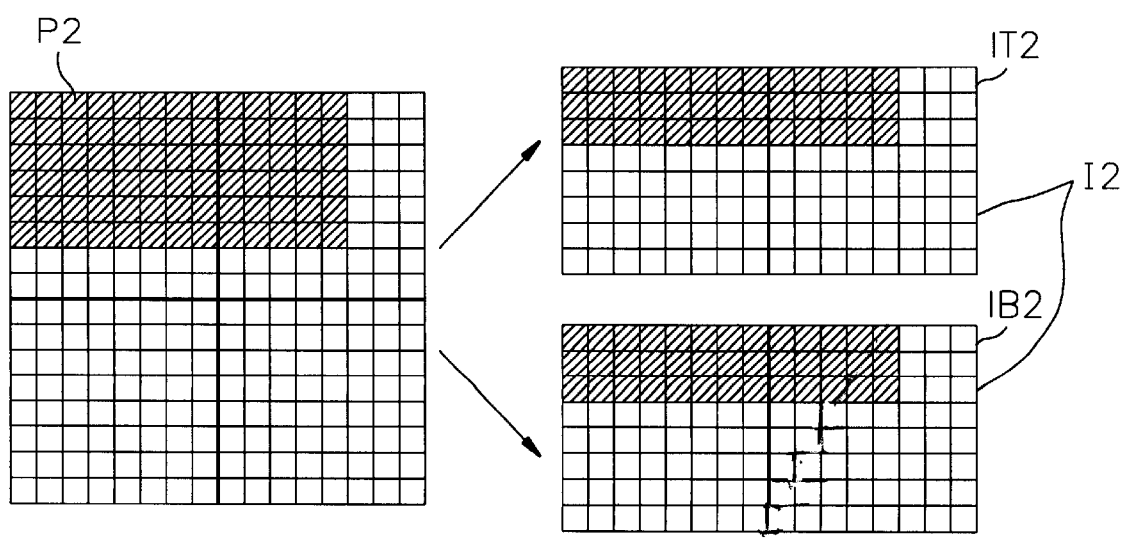
Figure 4C:
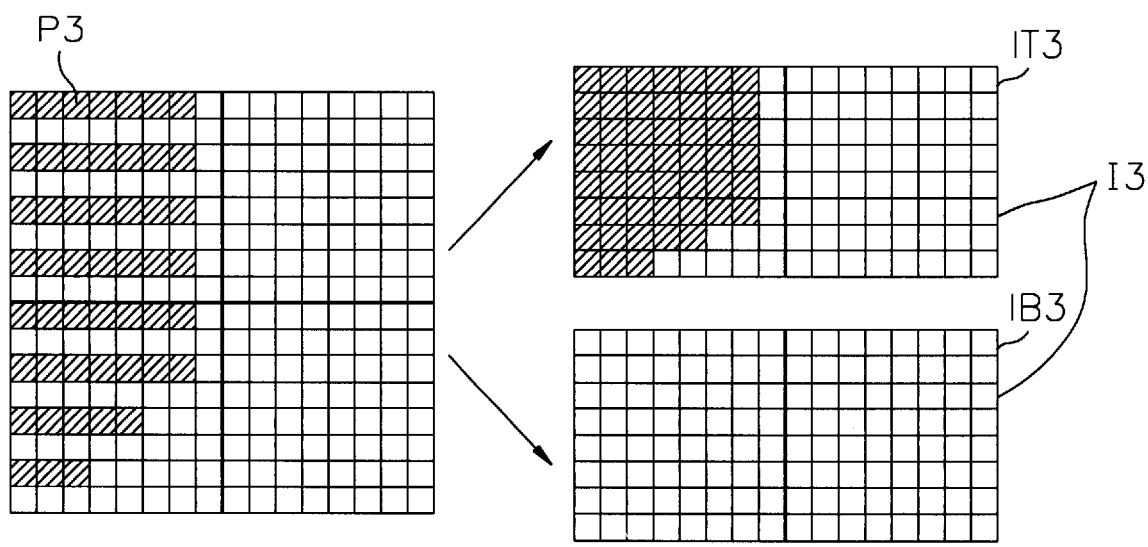

That is, if the block indication signal represents the boundary macroblock as exemplarily shown in FIGS. 4A to 4C, the DCT_type determination unit 120 produces a progressive coding indication signal regardless of the texture information and provides the progressive coding indication signal only to the modified DCT unit 130 via a line L16.

If the block indication signal represents the object macroblock, the DCT_type determination unit 120 decides the DCT_type of the processing macroblock by using a known DCT_type determination method based on the texture information and, then, supplies DCT_type information representing the DCT_type of the processing macroblock to the MUX 190 via a line L14 and the modified DCT unit 130 via the line L16.

If the block indication signal depicts the background macroblock, the DCT_type determination unit 120 provides a DCT disable signal to the modified DCT unit 130 via the line L16.

In response to the disable signal inputted thereto, the modified DCT unit 130 stops to perform a DCT process for the background macroblock. That is, the modified DCT unit 130 does not operate due to the DCT disable signal fed thereto.

On the other hand, in a conventional coding method, if the processing macroblock is determined as the background macroblock, the video signal encoder 10 does not perform any process for the background macroblock since its corresponding texture information is not coupled to the video signal encoder 10.

If either the progressive coding indication signal or the DCT_type information for the macroblock is fed thereto, the modified DCT unit 130 produces a set of DCT coefficients for a non-transparent DCT-block by performing a conventional DCT method based on the texture and the reconstructed shape information on the processing macroblock, wherein the non-transparent DCT-block has a DCT-block size and contains at least one object pixel therein. Meanwhile, as aforementioned, if the disable signal is inputted thereto, the modified DCT unit 130 does not perform any process and there is no output.

In accordance with the first embodiment of the present invention, referring to FIG. 3, there is provided a detailed block diagram of the modified DCT unit 130 including a shape re-forming sector 132, a texture re-forming sector 134, a selection sector 136 and a DCT sector 138.

If the progressive coding indication signal or the DCT_type information representing the progressive coding type is coupled thereto via the line L16, the shape re-forming sector 132 directly transfers the reconstructed shape information provided from the shape encoder 110 to the selection sector 136. On the other hand, the shape re-forming sector 132 provides re-formed shape information generated by re-forming the reconstructed shape information according to the interlaced coding technique to the selection sector 136 if the DCT_type information representing the interlaced coding type is inputted thereto.

Similarly, if the progressive coding indication signal or the DCT_type information representing the progressive coding type is coupled thereto via the line L16, the texture re-forming sector 134 directly delivers the texture information coupled thereto to the selection sector 136. On the other hand, the texture re-forming sector 134 provides reformed texture information produced by re-forming the texture information according to the interlaced coding technique to the selection sector 136 if the DCT_type information representing the interlaced coding type is inputted thereto.

In the above, if the disable signal is fed thereto via the line L16, the shape and the texture re-forming sectors 132 and 134 do not operate.

The selection sector 136 detects at least one non-transparent DCT-block among DCT-blocks in the progressive or the interlaced type macroblock corresponding to the processing macroblock based on the reconstructed or the re-formed shape information provided from the shape re-forming sector 132. Then, the selection sector 136 provides the texture or the re-formed texture information corresponding to each of the non-transparent DCT-blocks to the DCT sector 138.

The DCT sector 138 converts the texture or the re-formed texture information corresponding to each of the non-transparent DCT-blocks into a set of DCT coefficients and transfers the set of DCT coefficients to a quantization (Q) unit 135 in FIG. 1.

Hereinafter, the processes performed in the modified DCT unit 130 will be more descriptively illustrated according to the DCT_type of the processing macroblock.

If the DCT_type information is inputted, i.e., the processing macroblock is determined as the object macroblock, since the object macroblock has 4 non-transparent DCT-blocks therein as illustrated in the prior art, the modified DCT unit 130 converts the texture information corresponding to the processing macroblock, which is re-formed in response to the DCT_type information, to 4 sets of DCT coefficients and the 4 sets of DCT coefficients are sequentially fed to the Q unit 135.

In the above, if the progressive coding technique is selected for encoding the processing macroblock, the texture information on the progressive type macroblock is transformed into DCT coefficients at the modified DCT unit 130 on the DCT-block basis. On the other hand, if the interlaced coding technique is chosen, the texture information on the field DCT-blocks is converted into DCT coefficients on the DCT-block basis.

Meanwhile, if the progressive coding indication signal is coupled thereto, the modified DCT unit 130 converts the texture information on each of the non-transparent DCT-blocks, which are determined based on the reconstructed shape information, within the processing macroblock into DCT coefficients.

The DCT process for the boundary macroblock will be illustrated referring to FIGS. 4A to 4C which provide examples of the boundary macroblocks classified into two different types, i.e., the progressive and the interlaced type macroblocks. For the simplicity of explanation, assume that each of the boundary macroblocks in FIGS. 4A to 4C is derived from the reconstructed shape information provided from the shape encoder 110.

In accordance with the first embodiment of the present invention, since the boundary macroblock is processed only by the progressive coding technique and the modified DCT unit 130 performs the DCT process for non-transparent DCT-blocks, the texture information corresponding to each of the progressive type macroblocks P1 to P3 in FIGS. 4A to 4C is transformed at the modified DCT unit 130.

In FIG. 4A, since the progressive type macroblock P1 has only non-transparent DCT-blocks, the texture information on the processing macroblock is converted to 4 sets of DCT coefficients at the modified DCT unit 130. On the other hand, since the P2 and P3 have two transparent DCT-blocks and two non-transparent DCT-blocks, respectively, the texture information corresponding to each of the two non-transparent DCT-blocks is converted to a set of DCT coefficients.

Referring back to FIG. 1, as aforementioned, the sets of DCT coefficients produced at the modified DCT unit 130 are sequentially supplied to the Q unit 135.

The Q unit 135 quantizes a set of DCT coefficients provided from the modified DCT unit 130 and provides a set of quantized DCT coefficients to a statistic encoding unit 180 and an AC component detection unit 140.

The statistic encoding unit 180 produces encoded texture information by compressing the set of quantized DCT coefficients derived from the Q unit 135 through the use of, e.g., a variable length coding technique, and provides the encoded texture information to the MUX 190.

The AC component detection unit 140 checks whether there exists at least one non-zero AC component in the set of quantized DCT coefficients provided from the Q unit 135 and provides the check result to a CBPY generation unit 150.

If the check result represents that the set of quantized DCT coefficients contains at least one non-zero AC component therein, the CBPY generation unit 150 generates a CBPY bit, e.g., "1", for the set and, if otherwise, a CBPY bit, e.g., "0". If CBPY bits for all sets of DCT coefficients, i.e., all the non-transparent DCT-blocks, corresponding to the processing macroblock are decided through the above processes, the CBPY generation unit 150 provides the CBPY bits as CBPY information to a CBPY encoding unit 160. Referring to FIGS. 4A to 4C again, the CBPY information corresponding to the progressive type macroblock P1 has 4 CBPY bits; and those corresponding to the P2 and P3 blocks have 2 CBPY bits, respectively.

The CBPY encoding unit 160 finds a VLC code corresponding to the CBPY information among VLC tables stored at a VLC table unit 170, wherein the VLC table unit 170 includes various VLC tables predetermined depending on the bit-numbers of CBPY information and a frame type such as an I frame and a P frame and provides the detected VLC code to the MUX 190 as encoded CBPY information.

The MUX 190 multiplexes the DCT_type information, the encoded texture information, the encoded CBPY information and the encoded shape information fed thereto and provides a data stream for the processing macroblock in a sequence described in FIG. 5 to a transmitter (not shown) for the transmission thereof.

As illustrated hereinbefore, in accordance with the first embodiment of the present invention, if the processing macroblock is the boundary macroblock, the DCT_type of the boundary macroblock is fixed as the progressive coding type. Therefore, the DCT_type information representing the DCT_type need not be transmitted to a decoding part since the decoding part already knows the above rule defined in accordance with the first embodiment.

On the other hand, if the processing macroblock is the object macroblock, its DCT_type is determined based on the texture information thereof and, therefore, the DCT_type information representing the DCT_type should be transmitted to the decoding part.

If the encoded information is transmitted to the decoding part in the sequence described in FIG. 5, a video signal decoder first decodes the encoded shape information to thereby generate reconstructed shape information. If the reconstructed shape information corresponds to the boundary macroblock, the decoder can predict the bit-number of the CBPY information, i.e., the number of non-transparent DCT-blocks in the boundary macroblock, based on the reconstructed shape information since the decoder knows that the boundary macroblock is always encoded according to the progressive coding technique. On the other hand, if the reconstructed shape information corresponds to the object macroblock, the decoder can also predict the bit-number of the CBPY information since the object macroblock always has 4 non-transparent DCT-blocks therein. Consequently, although the DCT_type information follows the CBPY information as can be seen from the data stream having the sequence shown in FIG. 5, the decoder can reconstruct the CBPY information without errors.

Figure 2:
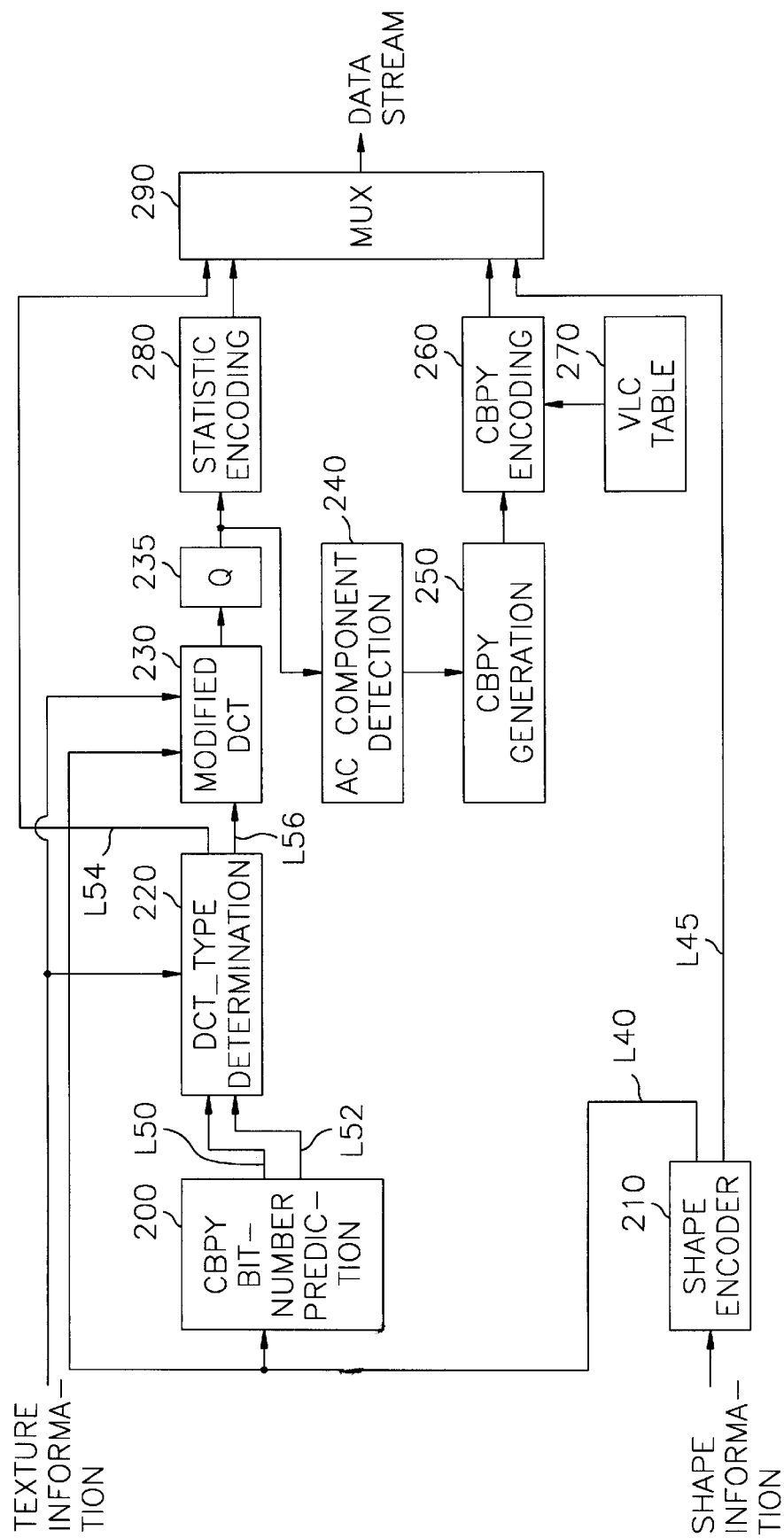
FIG. 2 provides a block diagram of the video signal encoder in accordance with a second embodiment of the present invention.

Referring to FIG. 2, there is provided a block diagram of a video signal encoder 20 in accordance with a second embodiment of the present invention.

As described through the first embodiment of the present invention, the texture information on a processing macroblock is inputted to a DCT_type determination unit 220 and a modified DCT unit 230 in parallel, and its corresponding shape information is coupled to a shape encoder 210.

The shape encoder 210 encodes the shape information by using a known shape coding method, e.g., the CAE technique disclosed in MPEG-4 supra to thereby generate encoded shape information to a multiplexor (MUX) 290 via a line L45. The shape encoder 210 also provides reconstructed shape information on the processing macroblock, which is produced by decoding the encoded shape information, to a CBPY bit-number prediction unit 200 and the modified DCT unit 230 via a line L40 in parallel.

The CBPY bit-number prediction unit 200 first re-forms the reconstructed shape information on the processing macroblock into a progressive and an interlaced type macroblocks according to the progressive and the interlaced coding techniques as exemplarily shown in FIGS. 4A to 4C, wherein the progressive type macroblock is identical to the processing macroblock. Then, the CBPY bit-number prediction unit 200 calculates the numbers of non-transparent DCT-blocks in the progressive and the interlaced type macroblocks.

For example, in FIG. 4A, the numbers of non-transparent DCT-blocks in the progressive and the interlaced type macroblocks P1 and I1 are identical to each other, e.g., 4. In FIG. 4B, the number of non-transparent DCT-blocks in the progressive type macroblock P2 is 2 while that of non-transparent DCT-blocks in the interlaced type macroblock I2 is 4. In FIG. 4C, the number of non-transparent DCT-blocks in the progressive type macroblock P3 is 2 while that of non-transparent DCT-blocks in the interlaced type macroblock I3 is 1. The numbers of non-transparent DCT-blocks in the progressive and the interlaced type macroblocks are provided to the DCT_type determination unit 220 via lines L50 and L52, respectively.

The DCT_type determination unit 220 decides a DCT_type of the processing macroblock in response to the texture information on the processing macroblock and the numbers of non-transparent DCT-blocks in the progressive and the interlaced type macroblocks coupled thereto from the CBPY bit-number prediction unit 200 via the lines L50 and L52.

That is, the DCT_type determination unit 220 compares the numbers of non-transparent DCT-blocks in the progressive and the interlaced type macroblocks.

As a result of the comparison process, if the numbers of non-transparent DCT-blocks in the progressive and the interlaced type macroblocks are different from each other, the DCT_type determination unit 220 decides a coding type corresponding to a smaller number as the DCT_type of the processing macroblock and provides DCT_type information representing the determined DCT_type only to the modified DCT unit 230 via a line L56. According to the above rule, the progressive coding type is selected as the DCT_type in FIG. 4B while the interlaced coding type is chosen in FIG. 4C.

On the other hand, if the numbers of non-transparent DCT-blocks in the progressive and the interlaced type macroblocks are non-zero and identical to each other as shown in FIG. 4A, the DCT_type determination unit 220 decides the DCT_type of the processing macroblock by using a known DCT_type determination method based on the texture information and, then, outputs DCT_type information representing the DCT_type of the processing macroblock to the MUX 290 via a line L54 and the modified DCT unit 230 via the line L56. Therefore, the texture information on the macroblock in FIG. 4A can be encoded by using either the progressive or the interlaced coding technique according to the DCT_type determined as above.

If the numbers of non-transparent DCT-blocks in the progressive and the interlaced type macroblocks are zero, i.e., if the processing macroblock is disclosed as the background macroblock, the DCT_type determination unit 220 supplies a DCT disable signal to the modified DCT unit 230 via the line L56.

In response to the disable signal inputted thereto, the modified DCT unit 230 stops to perform the DCT process for the background macroblock.

On the other hand, in a conventional coding method, if the processing macroblock is determined as the background macroblock, the video signal encoder 20 does not perform any process for the background macroblock since its corresponding texture information is not coupled to the video signal encoder 20.

If the DCT_type information on the processing macroblock is transferred thereto, the modified DCT unit 230 produces one or more sets of DCT coefficients for the processing macroblock on a DCT-block basis through the use of a conventional DCT method based on the texture and the reconstructed shape information for the processing macroblock with respect to the modified DCT unit 130 in FIG. 1. The sets of DCT coefficients produced from the modified DCT unit 230 are sequentially provided to a quantization (Q) unit 235.

Since operations of the other units of the video signal encoder 20, which include a statistic encoding unit 280, an AC component detection unit 240, a CBPY generation unit 250 and a CBPY encoding unit 260, are identical to those of the first embodiment of the present invention, the processes performed at the above units will be omitted for the simplicity of explanation hereinafter.

As illustrated above, in accordance with the second embodiment of the present invention, if the processing macroblock is the boundary macroblock, the DCT_type of the boundary macroblock is determined by comparing the numbers of non-transparent DCT-blocks in the progressive and the interlaced type macroblocks corresponding to the boundary macroblock. That is, a coding type corresponding to a smaller number is determined as the DCT_type of the processing macroblock. Therefore, the DCT_type information representing the DCT_type need not be transmitted to a decoding part since the decoding part already knows the above rule defined in accordance with the second embodiment.

On the other hand, if the processing macroblock is the object macroblock, its DCT_type is determined based on the texture information thereof as well as in the first embodiment and, thereafter, the DCT_type information representing the DCT_type should be transmitted to the decoding part.

If the encoded information is transmitted to the decoding part in the sequence described in FIG. 5, a video signal decoder first decodes the encoded shape information to thereby generate reconstructed shape information. If the reconstructed shape information corresponds to the boundary macroblock, the decoder can predict the bit-number of the CBPY information, i.e., the number of non-transparent DCT-blocks in the boundary macroblock since the decoder knows the rule used in determining the DCT_type of the boundary macroblock based on the reconstructed shape information.

If the reconstructed shape information corresponds to the object macroblock, the decoder can also predict the bit-number of the CBPY information since the object macroblock always has 4 non-transparent DCT-blocks therein. Consequently, although the DCT_type information follows the CBPY information as shown in FIG. 5, the decoder can accurately reconstruct the CBPY information.

In the first and the second embodiments of the present invention, it should be apparent to those having ordinary skill in the art that the shape information to be encoded can be used in lieu of the reconstructed shape information.

While the present invention has been described with respect to certain preferred embodiments only, other modifications and variations may be made without departing from the spirit and scope of the present invention as set forth in the following claims.

What is claimed is:

1. A method, for use in a video signal encoder, for coding texture information of a video signal which includes the texture information and shape information on each of macroblocks, each macroblock having M×M pixels and being dividable into P number of equal-sized DCT-blocks, M and P being positive integers, respectively, comprising the steps of:

(a) determining a DCT_type of a target macroblock based on the shape information and the texture information on the target macroblock, wherein the DCT_type represents the more effective coding technique between a progressive and an interlaced coding techniques for encoding the texture information, the step (a) including the steps of:

(a11) determining a block type of the target macroblock based on the shape information, wherein the block type is determined as either an object or a boundary macroblock, the boundary macroblock including at least one background pixel located outside an object expressed by the video signal and at least one object pixel located inside the object, and the object macroblock containing only object pixels;

(a12) selecting the progressive coding type as the DCT_type of the target macroblock if the target macroblock is the boundary macroblock; and (a13) deciding the DCT_type of the target macroblock by using the texture information if the target macroblock is determined as the object macroblock and providing DCT_type information representing the decided DCT_type;

(b) generating encoded texture information by adaptively encoding the texture information through the use of the progressive or the interlaced coding technique in response to the DCT_type, wherein the step (b) includes the steps of:

(b11) re-forming the texture information and the shape information in response to the DCT_type;

(b12) detecting one or more non-transparent DCT-blocks for the target macroblock based on the re-formed shape information, wherein each non-transparent DCT-block has a DCT-block size and contains at least one object pixel;

(b13) converting the re-formed texture information corresponding to each of the non-transparent DCT-blocks into a set of DCT coefficients;

(b14) quantizing the set of DCT coefficients to thereby produce a set of quantized DCT coefficients; and (b15) producing the encoded texture information by encoding the sets of quantized DCT coefficients corresponding to all of the non-transparent DCT-blocks;

(c1) checking whether there exists at least one non-zero AC component in the set of quantized DCT coefficients corresponding to each of the non-transparent DCT-blocks;

(d1) producing CBPY information representing whether each of the sets of quantized DCT coefficients corresponding to the target macroblock contains at least one non-zero AC component therein in conformity with the results of the step (c1); and (e1) providing encoded CBPY information by encoding the CBPY information.

2. The method of claim 1 further comprising the step of producing encoded shape information by encoding the shape information on the target macroblock.

3. The method of claim 2 further comprising the step of supplying a data stream to be transmitted which contains encoded information in sequence of the encoded shape information, the encoded CBPY information, the DCT_type information and the encoded texture information.

4. The method of claim 1 further comprising, prior to the step (a), the step of producing encoded shape information by encoding input shape data on the target macroblock and generating the shape information on the target macroblock by decoding the encoded shape information.

5. The method of claim 4 further comprising the step of supplying a data stream to be transmitted which contains encoded information in sequence of the encoded shape information, the encoded CBPY information, the DCT_type information and the encoded texture information.

6. A method, for use in a video signal encoder, for coding texture information of a video signal which includes the texture information and shape information on each of macroblocks, each macroblock having M×M pixels and being dividable into P number of equal-sized DCT-blocks, M and P being positive integers, respectively, comprising the steps of:

(a) determining a DCT_type of a target macroblock based on the shape information and the texture information on the target macroblock, wherein the DCT_type represents the more effective coding technique between a progressive and an interlaced coding techniques for encoding the texture information, the step (a) including the steps of:

(a21) re-forming the shape information on the target macroblock into a progressive and an interlaced type macroblocks according to the progressive and the interlaced coding techniques, respectively;

(a22) calculating numbers of non-transparent DCT-blocks in the progressive and the interlaced type macroblocks, wherein each non-transparent DCT-block has a DCT-block size and contains at least one object pixel located inside an object expressed by the video signal; and (a23) deciding the DCT_type of the target macroblock based on the texture information and the numbers of non-transparent DCT-blocks in the progressive and the interlaced type macroblocks, wherein the step (a23) contains the steps of:

(a231) comparing the numbers of non-transparent DCT-blocks in the progressive and the interlaced type macroblocks;

(a232) selecting a coding type corresponding to a smaller number as the DCT_type of the target macroblock if the numbers of non-transparent DCT-blocks in the progressive and the interlaced type macroblocks are different from each other; and (a233) deciding the DCT_type of the target macroblock by using the texture information if the numbers of non-transparent DCT-blocks in the progressive and the interlaced type macroblocks are non-zero and identical to each other and providing DCT_type information representing the decided DCT_type;

(b) generating encoded texture information by adaptively encoding the texture information through the use of the progressive or the interlaced coding technique in response to the DCT_type, wherein the step (b) includes the steps of:

(b21) re-forming the texture information and the shape information in response to the DCT_type;

(b22) detecting one or more non-transparent DCT-blocks for the target macroblock based on the re-formed shape information;
(b23) converting the re-formed texture information corresponding to each of the non-transparent DCT-blocks into a set of DCT coefficients;
(b24) quantizing the set of DCT coefficients to thereby produce a set of quantized DCT coefficients; and
(b25) producing the encoded texture information by encoding the sets of quantized DCT coefficients corresponding to all of the non-transparent DCT-blocks;
(c2) checking whether there exists at least one non-zero AC component in the set of quantized DCT coefficients corresponding to each of the non-transparent DCT-blocks;
(d2) producing CBPY information representing whether each of the sets of quantized DCT coefficients corresponding to the target macroblock contains at least one non-zero AC component therein in conformity with the results of the step (c2); and
(e2) providing encoded CBPY information by encoding the CBPY information.

7. The method of claim 6 further comprising the step of producing encoded shape information by encoding the shape information on the target macroblock.

8. The method of claim 7 further comprising the step of supplying a data stream to be transmitted which contains encoded information in sequence of the encoded shape information, the encoded CBPY information, the DCT_type information and the encoded texture information.

9. The method of claim 6 further comprising, prior to the step (a), the step of producing encoded shape information by encoding input shape data on the target macroblock and generating the shape information on the target macroblock by decoding the encoded shape information.

10. The method of claim 9 further comprising the step of supplying a data stream to be transmitted which contains encoded information in sequence of the encoded shape information, the encoded CBPY information, the DCT_type information and the encoded texture information.

11. An apparatus for coding a video signal which includes texture information and shape information on each of macroblocks, a macroblock having M×M pixels and being dividable into P number of equal-sized DCT-blocks, M and P being positive integers, respectively, comprising:
means for producing encoded shape information by encoding the shape information on a target macroblock and generating reconstructed shape information by decoding the encoded shape information;
means for determining a DCT_type of the target macroblock based on the reconstructed shape information and the texture information on the target macroblock and providing DCT_type information representing the DCT_type, wherein the DCT_type represents the more effective coding technique between a progressive and an interlaced coding techniques for encoding the texture information, the DCT_type determining means including:
means for determining a block type of the target macroblock based on the reconstructed shape information, wherein the block type is determined as either an object or a boundary macroblock, the boundary macroblock including at least one background pixel located outside an object expressed by the video signal and at least one object pixel located inside the object, and the object macroblock containing only object pixels, and providing a block indication signal representing the block type; and
means for deciding the DCT_type of the target macroblock in response to the block indication signal and providing the DCT_type information, wherein if the block indication signal represents the boundary macroblock, the DCT_type of the target macroblock becomes a progressive coding type and, if the block indication signal shows the object macroblock, the DCT_type deciding means determines the DCT_type of the target macroblock by using the texture information;
means for generating encoded texture information by adaptively encoding the texture information through the use of the progressive or the interlaced coding technique in response to the DCT_type information, wherein the encoded texture information generating means includes:
means for re-forming the texture information and the reconstructed shape information in response to the DCT_type;
means for detecting one or more non-transparent DCT-blocks for the target macroblock based on the re-formed shape information, wherein each non-transparent DCT-block has a DCT-block size and contains at least one object pixel;
means for converting the re-formed texture information corresponding to each of the non-transparent DCT-blocks into a set of DCT coefficients;
means for quantizing the set of DCT coefficients to thereby produce a set of quantized DCT coefficients; and
means for producing the encoded texture information by encoding the sets of quantized DCT coefficients corresponding to all of the non-transparent DCT-blocks;
means for checking whether there exists at least one non-zero AC component in the set of quantized DCT coefficients corresponding to each of the non-transparent DCT-blocks;
means for producing CBPY information representing whether each of the sets of quantized DCT coefficients corresponding to the target macroblock contains at least one non-zero AC component therein in conformity with the checking result; and
means for providing encoded CBPY information by encoding the CBPY information.

12. The apparatus as recited in claim 11 further comprising:
means for supplying a data stream to be transmitted which contains encoded information in sequence of the encoded shape information, the encoded CBPY information, the DCT_type information and the encoded texture information.

13. An apparatus for coding a video signal which includes texture information and shape information on each of macroblocks, a macroblock having M×M pixels and being dividable into P number of equal-sized DCT-blocks, M and P being positive integers, respectively, comprising:
means for producing encoded shape information by encoding the shape information on a target macroblock and generating reconstructed shape information by decoding the encoded shape information;
means for determining a DCT_type of the target macroblock based on the reconstructed shape information and the texture information on the target macroblock and providing DCT_type information representing the DCT_type, wherein the DCT_type represents the more effective coding technique between a progressive and an interlaced coding techniques for encoding the texture information, the DCT_type determining means including:

means for re-forming the reconstructed shape information into a progressive and an interlaced type macroblocks according to the progressive and the interlaced coding techniques, respectively;

means for calculating the numbers of non-transparent DCT-blocks in the progressive and the interlaced type macroblocks, wherein each non-transparent DCT-block has a DCT-block size and contains at least one object pixel located inside an object expressed by the video signal; and means for deciding the DCT_type of the target macroblock based on the texture information and the numbers of non-transparent DCT-blocks in the progressive and the interlaced type macroblocks, wherein the DCT_type deciding means contains:

means for comparing the numbers of non-transparent DCT-blocks in the progressive and the interlaced type macroblocks;

means for choosing a coding type corresponding to a smaller number as the DCT_type of the target macroblock if the numbers of non-transparent DCT-blocks in the progressive and the interlaced type macroblocks are different from each other; and means for deciding the DCT_type of the target macroblock by using the texture information if the numbers of non-transparent DCT-blocks in the progressive and the interlaced type macroblocks are non-zero and identical to each other and providing DCT_type information representing the decided DCT_type;

means for generating encoded texture information by adaptively encoding the texture information through the use of the progressive or the interlaced coding technique in response to the DCT_type information, wherein the encoded texture information generating means includes:

means for re-forming the texture information and the reconstructed shape information in response to the DCT_type;

means for detecting one or more non-transparent DCT-blocks for the target macroblock based on the re-formed shape information;

means for converting the re-formed texture information corresponding to each of the non-transparent DCT-blocks into a set of DCT coefficients;

means for quantizing the set of DCT coefficients to thereby produce a set of quantized DCT coefficients; and means for producing the encoded texture information by encoding the sets of quantized DCT coefficients corresponding to all of the non-transparent DCT-blocks;

means for checking whether there exists at least one non-zero AC component in the set of quantized DCT coefficients corresponding to each of the non-transparent DCT-blocks;

means for producing CBPY information representing whether each of the sets of quantized DCT coefficients corresponding to the target macroblock contains at least one non-zero AC component therein in conformity with the checking result; and means for providing encoded CBPY information by encoding the CBPY information.

14. The apparatus as recited in claim 13 further comprising:

means for supplying a data stream to be transmitted which contains encoded information in sequence of the encoded shape information, the encoded CBPY information, the DCT_type information and the encoded texture information.

* * * * *